United States Patent [19]

Callahan

[11] 4,323,168

[45] Apr. 6, 1982

[54] METHOD AND APPARATUS FOR DISPENSING FLEXIBLE TRAYS

[75] Inventor: Kevin M. Callahan, Philadelphia, Pa.

[73] Assignee: International Paper Company, New York, N.Y.

[21] Appl. No.: 159,239

[22] Filed: Jun. 13, 1980

[51] Int. Cl.³ .............................................. B65H 3/00
[52] U.S. Cl. .................................... 221/42; 221/242; 221/277; 414/129; 271/23
[58] Field of Search ...................... 221/33, 36, 41, 42, 221/44, 241, 242, 259, 261, 277, 303; 414/129; 271/16, 23

[56] References Cited

U.S. PATENT DOCUMENTS

| | | |
|---|---|---|
| 1,708,441 | 4/1929 | Cole .................................... 221/42 |
| 2,361,364 | 10/1944 | Bell . |
| 2,403,466 | 7/1946 | Stutz . |
| 2,533,932 | 12/1950 | Hayek .............................. 221/42 X |
| 2,546,291 | 3/1951 | Baumgartner . |
| 2,844,283 | 7/1958 | Whitehead ............................ 221/42 |
| 3,281,143 | 10/1966 | Mommsen et al. ............... 271/23 X |
| 3,379,346 | 4/1968 | Frederick et al. . |
| 3,477,592 | 11/1969 | Kuhlman . |
| 3,542,243 | 11/1970 | Stockdale . |
| 3,606,960 | 9/1971 | Butterworth ..................... 221/41 X |
| 3,658,194 | 4/1972 | Gendron et al. . |
| 3,695,484 | 10/1972 | Hollinger . |
| 3,980,204 | 9/1976 | Du Broff et al. . |
| 4,180,180 | 12/1979 | Fries . |

Primary Examiner—Joseph J. Rolla
Attorney, Agent, or Firm—Stephen P. Gilbert

[57] ABSTRACT

Method and apparatus for dispensing trays one at a time from the bottom of a nested stack of flanged flexible trays are disclosed. The bottommost tray rests on two supports, thereby supporting the stack, and a rotating barb or the like compresses the bottommost tray lengthwise so that it can pass between the supports and fall free of the stack.

9 Claims, 8 Drawing Figures

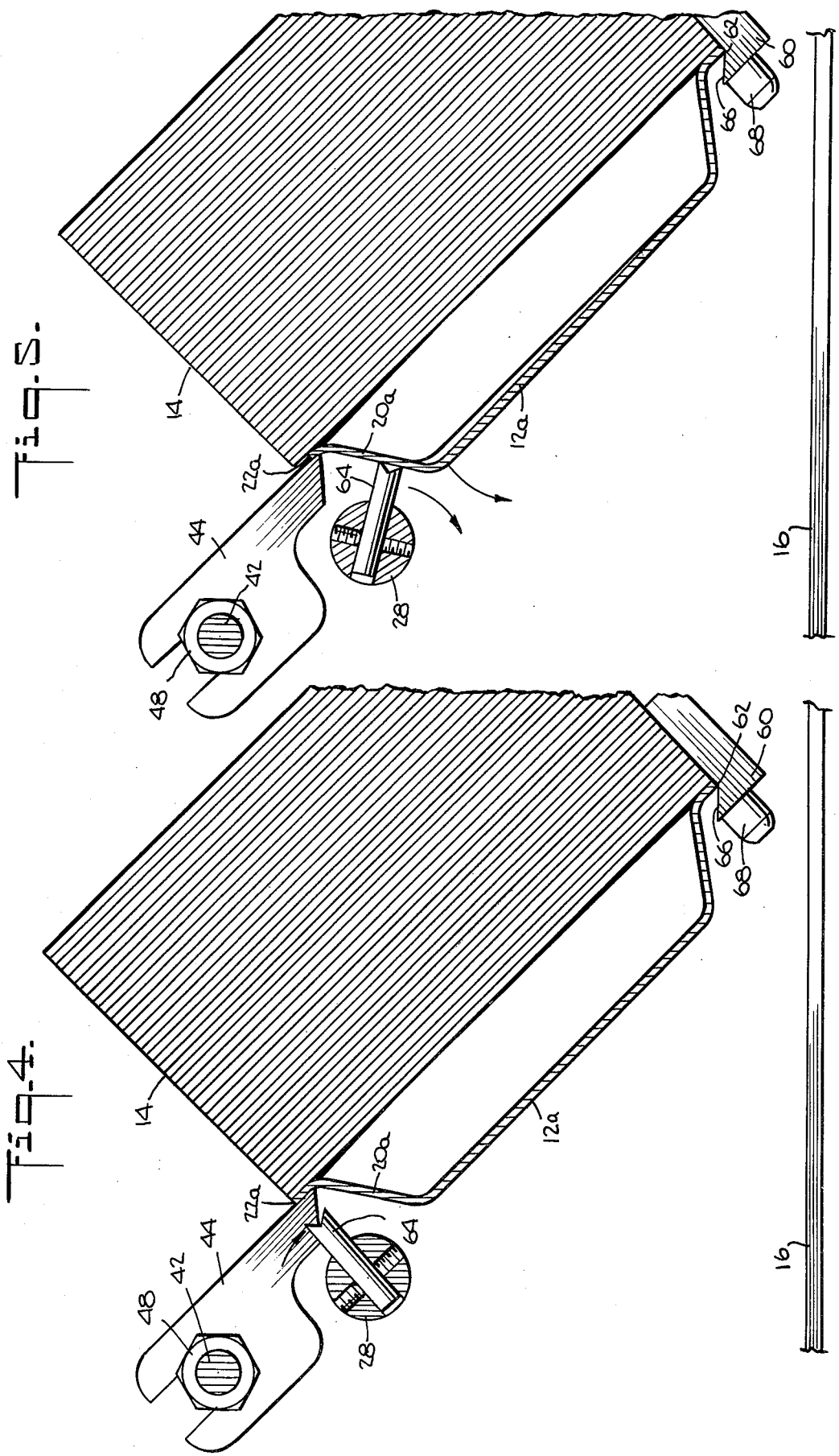

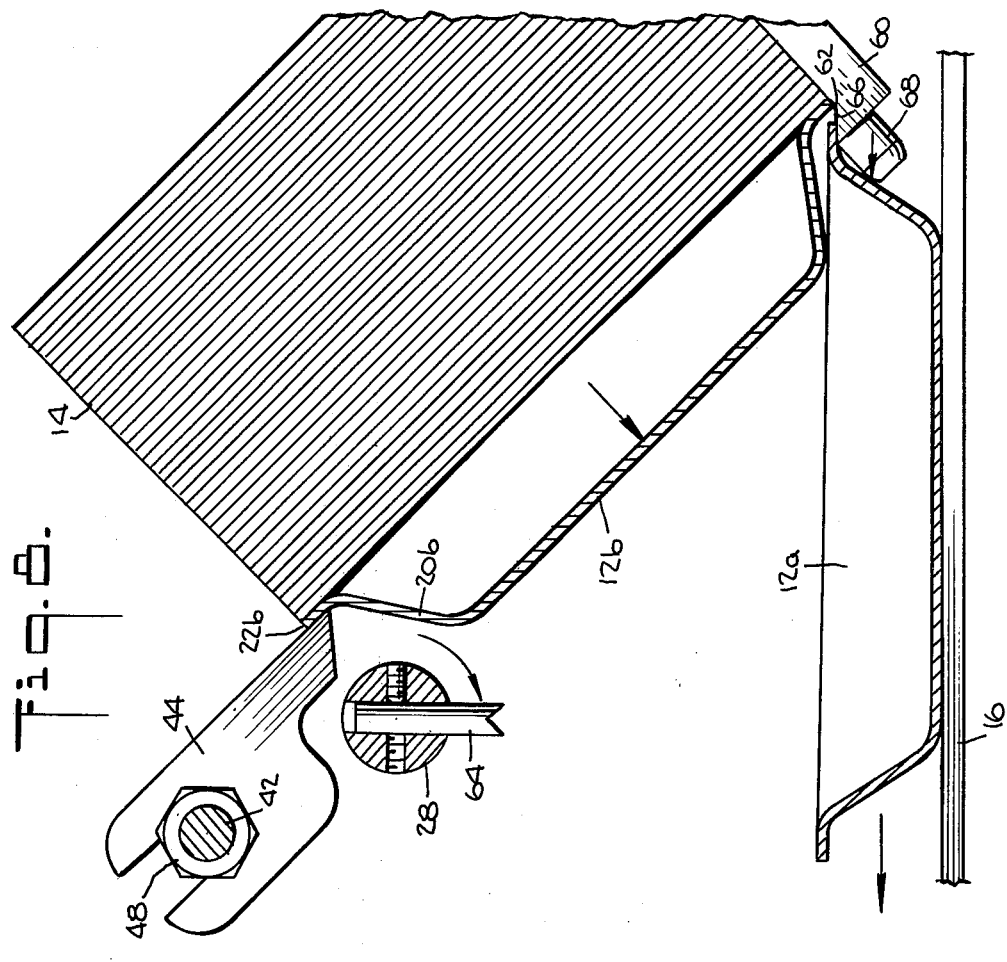
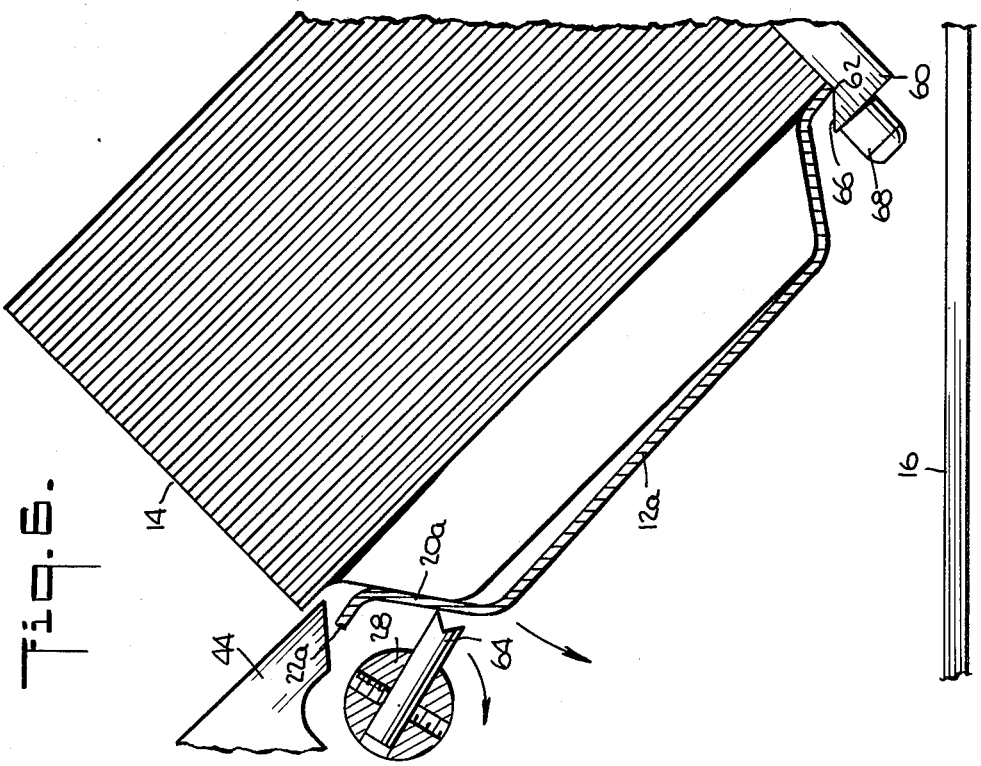

METHOD AND APPARATUS FOR DISPENSING FLEXIBLE TRAYS

BACKGROUND OF THE INVENTION

This invention relates to the dispensing of flexible, flanged trays one at a time from the bottom of a nested stack of such trays. These trays are widely used in the food industry, for example, by frozen food producers. Typically, these trays are shipped to the food producers in nested stacks. The trays must then be separated before filling them with food.

A continuing problem has been how to separate them rapidly and without error so that high-speed production line techniques for filling and packaging them can be used. Various solutions to the problem have been proposed (see, e.g., U.S. Pat No. 4,180,180, to Carl Fries, Jr., and the methods discussed therein).

SUMMARY OF THE INVENTION

A new, simple device for dispensing flexible, flanged trays one at a time from the bottom of a nested stack of such trays has been developed.

The device has two supports that are spaced at a distance less than a length of the trays so that the bottommost tray in the stack can rest on the supports. (By "length" is meant any flange-to-flange distance across the top of the tray.) Means are provided to compress the bottommost tray lengthwise so that it can pass between the supports. Means are also provided to impart a downward movement to the bottommost tray.

In one embodiment, one support is higher than the other so that the stack of trays is at an angle to the vertical. In another embodiment the same means both compresses the bottommost tray and imparts the downward movement to it; preferably this means is a rotating barb. In a preferred embodiment, one support is higher than the other, the lower support has a pivot point about which the bottommost tray rotates as it is dispensed, and a rotating barb is used.

BRIEF DESCRIPTION OF THE DRAWINGS

To aid in further describing this invention, the following drawings are provided in which:

FIGS. 4 to 8 are partial sectional views of the device, showing in sequence steps in the dispensing of a tray from the bottom of a nested stack of trays.

It should be understood that these drawings are for illustrative purposes only and are not intended to limit the scope of the invention.

DETAILED DESCRIPTION OF THE INVENTION

Figure 1:
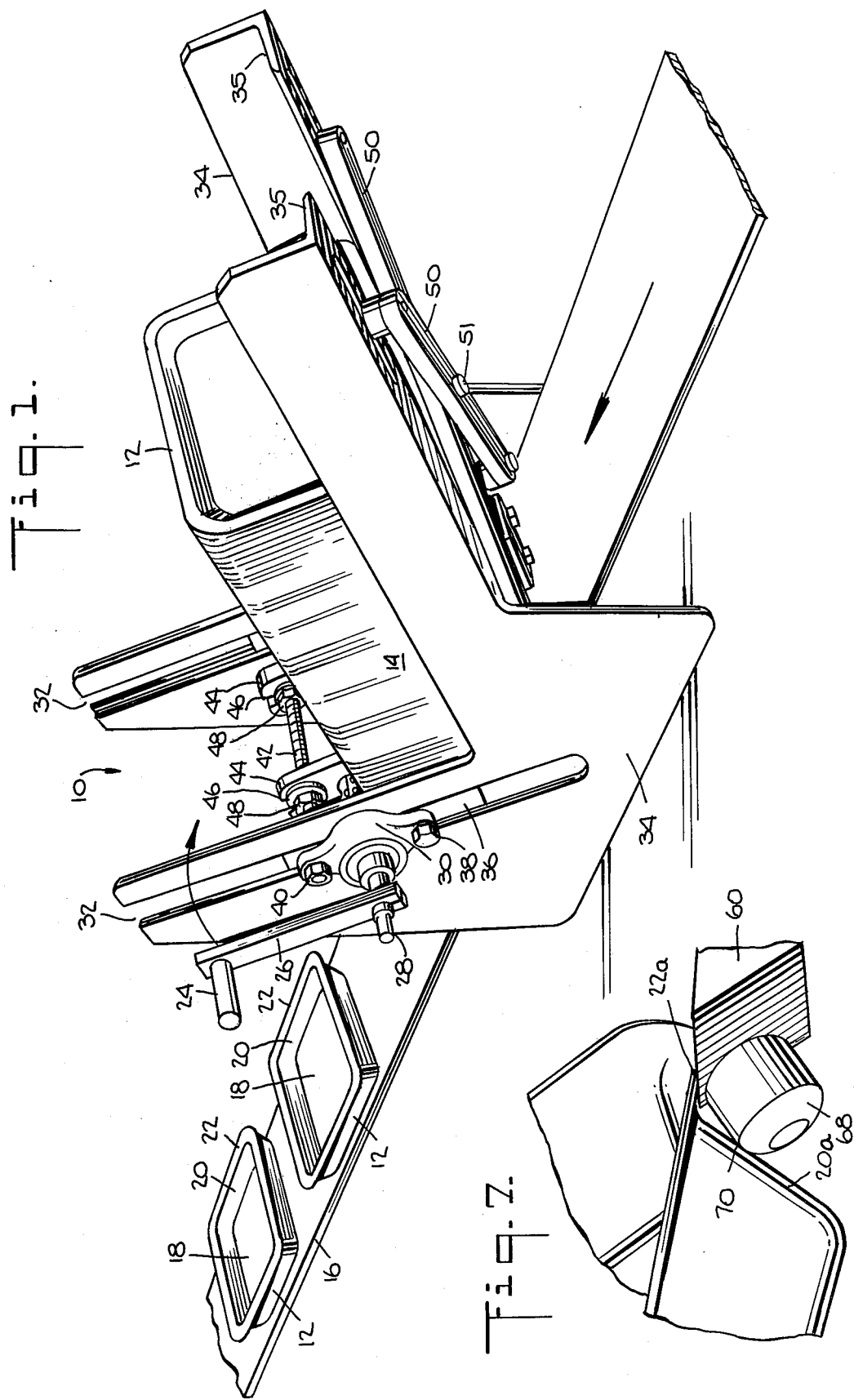
FIG. 1 is a rear perspective view of a preferred embodiment of the invention, shown dispensing trays onto a conveyor belt.

A preferred embodiment of the present invention is shown in the accompanying drawings. In FIG. 1, the preferred device 10 is shown located above conveyor belt 16. Stack 14 of nested trays 12 rests in device 10. Two trays have already been dispensed and are riding on the conveyor belt. Each tray 12 comprises tray bottom 18, sidewall 20, and peripheral flange 22. The sidewall slopes inwardly from the flange to the tray bottom.

Device 10 has two body sections 34 having angled portions 35 on which the lower side of the tray stack rests. As will be described below, cross-arms 50, connected to each other by screw 51, allow body parts 34 to be moved closer to or away from each other to accommodate trays of different sizes.

Bearing assemblies 30 (only one of which is shown) are attached to plates 36 by bolts 38 and by nuts 40 on threaded rod 42. When tightened, these nuts and bolts compress each body section 34 between its respective bearing assembly 30 and plate 36, thereby locking the bearing assemblies and threaded rod 42 at a given position along slots 32 and locking body sections 34 at a given distance from one another. Upper tray supports 44 are fixed along threaded rod 42 by washers 46 and nuts 48. Rotor shaft 28 is rotatably mounted in bearing assemblies 30 and is manually turned by handle 24 on crank-arm 26.

Figure 2:
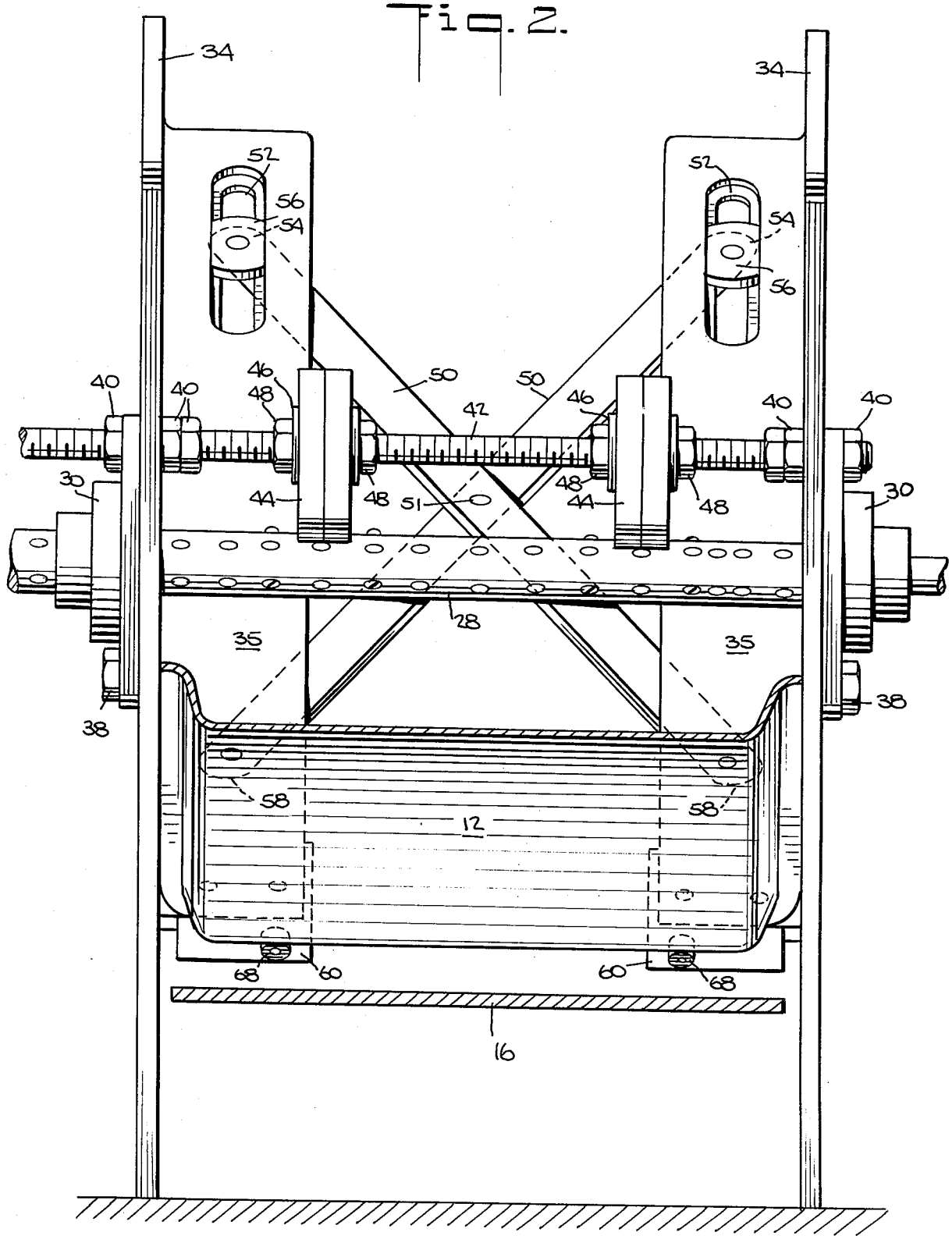
FIG. 2 is a front view of the device of FIG. 1.

FIG. 2 is a front view of the device. (For clarity, the stack is omitted and only a portion of one tray is shown.) In this view lower supports 60 having kick-out studs 68 are shown. These supports are attached to angled portions 35 of body sections 34. Cross-arms 50 are rotatably mounted at their lower ends 58 to angled portions 35. Upper ends 54 are attached to oblong portions 56, which are slidably mounted in slots 52.

Figure 3:
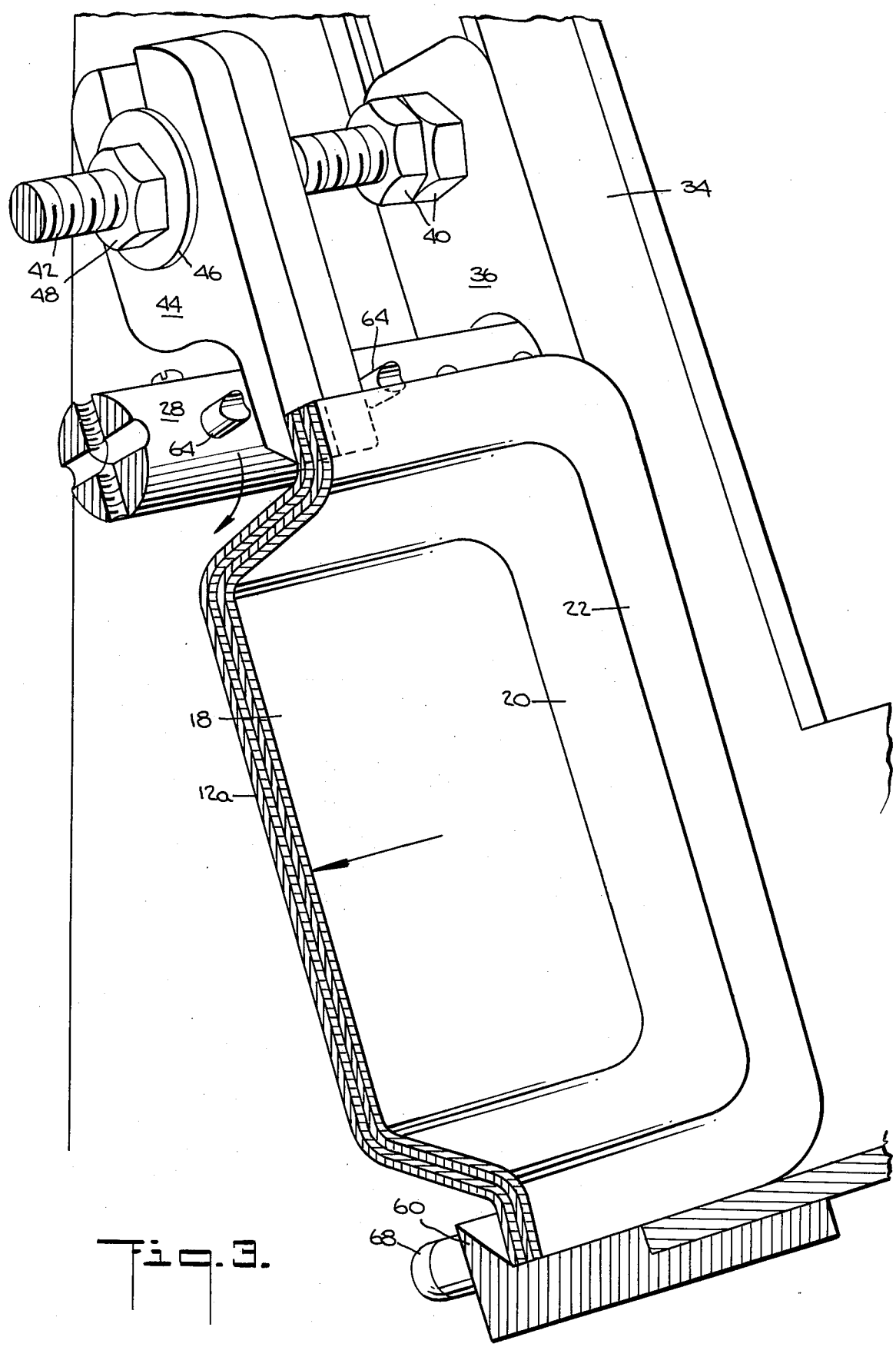
FIG. 3 is a rear partial perspective view of the device of FIG. 1.

In FIG. 3, bottommost tray 12a is shown resting on upper support 44 and lower support 60. Barbs 64 are located in rotor shaft 28. The arrow next to that shaft indicates its direction of rotation. The arrow at tray bottom 18 indicates the direction of movement of the trays as they are dispensed from the bottom of the stack.

FIG. 4 shows flange 22a of bottommost tray 12a resting on upper support 44 and on lower support 60 (having substantially horizontal surface 66) at pivot point 62. In FIG. 5, shaft 28 has rotated far enough from its position in FIG. 4 to bring barb 64 into contact with tray sidewall 20a, thus compressing the tray longitudinally. The combination of compression and rotation of barb 64 forces the upper end of tray 12a down, away from the tray above it, while the bottom edge of flange 22a remains at pivot point 62.

In FIG. 6, further rotation of the barb has increased the separation between tray 12a and the penultimate tray and has compressed the tray along its length so that the upper edge of flange 22a has slipped by upper supports 44. In FIG. 7, a detail view intermediate the views of FIGS. 6 and 8, tray 12a, no longer contacted by barb 64, has rotated sufficiently for the lower tray sidewall 20a to contact kick-out stud 68 at point 70.

Continued counter-clockwise rotation of tray 12a and contact with kick-out stud 68 forces the tray to move to the left, as shown in FIG. 8, thereby insuring that the tray is not pinned between the penultimate tray and lower support 60. In FIG. 8, tray 12a has fallen onto conveyor belt 16, which will move it to the left.

Numerous modifications to the device may be made. For example, the device need not be manually driven, and an automatic stack loader may be added. The trays dispensed may be of any shape, for example, circular, elliptical, rectangular, triangular, but rectangular will usually be employed. If rectangular non-square trays are used, the stack may be placed in the device so that the compression means engage a long or short side of the tray.

Any means that compresses the tray along its length and causes it to pass between the support points may be used. Such means include a barb on a rotating shaft, as described above, and a reciprocating barb. A pusher may be used near the lower support to insure that the tray being dispensed clears the bottom support, i.e., is not pinned between the support and the new bottom tray. One or more tray supports may be used at each support point (in the device shown in the drawings, two upper supports 44 and two lower supports 60 are used).

Other changes will be obvious to those skilled in the art and the claims are intended to cover all modifications and variations that fall within the true spirit and scope of the invention.

I claim:

1. Apparatus for dispensing trays one at a time from the bottom of a nested stack of flexible, flanged trays, each tray having a sidewall, said apparatus comprising:
   (a) first and second supports spaced at a distance less than the length of the bottommost tray in the stack to permit the flange of that tray to rest on the supports and support the stack;
   (b) means to compress the bottommost tray lengthwise sufficiently by pushing on its sidewall so that the tray can pass downwardly between the supports; and
   (c) means to impart a downward movement to the bottommost tray.

2. The apparatus of claim 1 wherein the same means compresses the bottommost tray and imparts the downward movement to it.

3. The apparatus of claim 2 wherein the means that compresses the bottommost tray and imparts downward movement to it is a rotating barb.

4. The apparatus of claim 3 further comprising means to prevent the bottommost tray being dispensed from being pinned between the penultimate tray in the stack and either of the supports.

5. Apparatus for dispensing trays one at a time from the bottom of a nested stack of flexible, flanged trays, each tray having a sidewall, said apparatus comprising the elements:
   (a) upper and lower supports spaced at a distance less than the flange-to-flange length of the bottommost tray in the stack to permit the flange of that tray to rest on the supports and support the stack, said upper support being higher than the lower support so that the stack resting on the supports is at an angle to the vertical, and said lower support having a pivot point; and
   (b) means located near the upper support to
      (i) compress the bottommost tray lengthwise sufficiently by pushing on its sidewall so that the tray can pass downwardly between the supports and
      (ii) impart a downward movement to the bottommost tray so that the tray rotates about the pivot point while being dispensed.

6. The apparatus of claim 5 wherein the means of element (b) is a rotating barb.

7. The apparatus of claim 6 further comprising means to prevent the bottommost tray being dispensed from being pinned between the penultimate tray in the stack and the lower support.

8. The apparatus of claim 7 wherein the means to prevent pinning is a kick-out stud.

9. A process for dispensing trays one at a time from the bottom of a nested stack of flexible, flanged trays, each tray having a sidewall, said process comprising the steps:
   (a) supporting the bottommost tray in the stack on upper and lower supports spaced at a distance less than the length of the tray, said upper support being higher than the lower support and said lower support having a pivot point;
   (b) compressing the bottommost tray lengthwise sufficiently by pushing on its sidewall so that the tray can pass between the supports; and
   (c) rotating the bottommost tray downwardly around the pivot point.

* * * * *